United States Patent
Perriere (10) Patent No.: US 10,374,484 B2
(45) Date of Patent: Aug. 6, 2019

(54) CURRENT GENERATION DEVICE FOR PIPELINE

(71) Applicant: SAVE INNOVATIONS, Grenoble (FR)

(72) Inventor: Bernard Perriere, Seyssins (FR)

(73) Assignee: SAVE INNOVATIONS, Grenoble (FR)

( * ) Notice: Subject to any disclaimer, the term of this patent is extended or adjusted under 35 U.S.C. 154(b) by 0 days.

(21) Appl. No.: 14/916,783

(22) PCT Filed: Aug. 29, 2014

(86) PCT No.: PCT/EP2014/068357
§ 371 (c)(1),
(2) Date: Mar. 4, 2016

(87) PCT Pub. No.: WO2015/032697
PCT Pub. Date: Mar. 12, 2015

(65) Prior Publication Data
US 2016/0226340 A1    Aug. 4, 2016

(30) Foreign Application Priority Data

Sep. 5, 2013  (FR) ...................... 13 58527

(51) Int. Cl.
*H02K 7/18*    (2006.01)
*F03B 13/10*   (2006.01)
(Continued)

(52) U.S. Cl.
CPC .............. *H02K 7/1823* (2013.01); *F03B 3/04* (2013.01); *F03B 13/10* (2013.01); *H02K 1/06* (2013.01);
(Continued)

(58) Field of Classification Search
CPC .......... H02K 7/1823; H02K 1/06; H02K 3/04; H02K 5/12; H02K 5/20; H02K 9/00;
(Continued)

(56) References Cited

U.S. PATENT DOCUMENTS 4,166,596 A * 9/1979 Mouton, Jr. .............. B64B 1/50
244/30
4,217,501 A * 8/1980 Allison ................... F03D 13/20
290/55

(Continued)

FOREIGN PATENT DOCUMENTS

CN        2434818 Y      6/2001
CN     2006/028377 A1    3/2006
(Continued)

OTHER PUBLICATIONS

International Search Report and Written Opinion dated Nov. 12, 2014 issued in corresponding application No. PCT/EP2014/068357; w/ English partial translation and partial machine translation (16 pages).

(Continued)

*Primary Examiner* — Julio C. Gonzalez
*Assistant Examiner* — Joseph Ortega
(74) *Attorney, Agent, or Firm* — Westerman, Hattori, Daniels & Adrian, LLP (57) ABSTRACT

The device for generating an electrical current, intended for a pipeline, includes a pipe element (1), a rotor (2) suitable for being set in motion by the fluid and a stator (3a, 3b) arranged to cooperate with an end of the rotor (2) opposite to an axis of rotation (4) of said rotor (2) in order to generate the electrical current. The axis of rotation (4) is mounted at its opposing longitudinal ends (4a, 4b) on first and second supports (5a, 5b) arranged on either side of the plane of rotation (P1) of the rotor (2) and each linked to the pipe element (1). The stator has at least one ring (3a) arranged on one side of the rotor (2), and each ring (3a, 3b) includes a circuit suitable for generating all or part of the electrical current when excited by a magnetic element of the rotor (2).

18 Claims, 4 Drawing Sheets

(51) Int. Cl.
  *H02K 1/06* (2006.01)
  *H02K 3/04* (2006.01)
  *H02K 5/12* (2006.01)
  *H02K 5/20* (2006.01)
  *H02K 9/00* (2006.01)
  *F03B 3/04* (2006.01)

(52) U.S. Cl.
  CPC .............. *H02K 3/04* (2013.01); *H02K 5/12* (2013.01); *H02K 5/20* (2013.01); *H02K 9/00* (2013.01); *F05B 2220/20* (2013.01); *F05B 2220/7068* (2013.01); *Y02E 10/22* (2013.01); *Y02E 10/223* (2013.01)

(58) Field of Classification Search
  CPC ........ F03B 3/04; F03B 13/10; F05B 2220/20; F05B 2220/7068; Y02E 10/22; Y02E 10/223
  See application file for complete search history.

(56) References Cited

U.S. PATENT DOCUMENTS

| | | | | |
|---|---|---|---|---|
| 4,470,563 A * | 9/1984 | Engelsman | ............... | F03D 9/25 244/33 |
| 4,491,739 A * | 1/1985 | Watson | ................... | F03D 13/20 290/44 |
| 4,720,640 A * | 1/1988 | Anderson | ............. | F03B 13/083 290/43 |
| 4,740,711 A * | 4/1988 | Sato | ...................... | F01B 13/061 290/52 |
| 4,894,554 A * | 1/1990 | Farmer | ................... | F03D 13/20 290/55 |
| 5,435,259 A * | 7/1995 | Labrador | ............... | B01D 61/10 114/39.31 |
| 6,327,994 B1 * | 12/2001 | Labrador | ............... | B01D 61/10 114/382 |
| 7,385,303 B2 * | 6/2008 | Roos | ........................ | F01D 15/10 290/54 |
| 2004/0160063 A1 * | 8/2004 | Le Nabour | ............... | F03D 1/04 290/55 |
| 2005/0103339 A1 * | 5/2005 | Daly | ................. | A61M 16/0057 128/204.18 |
| 2006/0233635 A1 * | 10/2006 | Selsam | ................... | F03D 1/065 415/4.3 |
| 2007/0040385 A1 * | 2/2007 | Uchiyama | ................. | F03D 3/02 290/44 |
| 2007/0145751 A1 * | 6/2007 | Roos | ....................... | F01D 15/10 290/52 |
| 2010/0026007 A1 * | 2/2010 | Bevirt | ..................... | B64C 31/06 290/55 |
| 2010/0103646 A1 * | 4/2010 | Coushaine | .............. | F03B 13/00 362/96 |
| 2010/0148515 A1 * | 6/2010 | Geddry | ................ | F03B 17/061 290/55 |
| 2010/0176597 A1 * | 7/2010 | Harris | ....................... | F03B 1/02 290/54 |
| 2012/0007364 A1 * | 1/2012 | David | .................... | F03B 13/10 290/54 |
| 2013/0189099 A1 * | 7/2013 | Jensen | ..................... | F03D 1/04 416/1 |
| 2013/0230380 A1 * | 9/2013 | Allouche | .................. | F01D 5/03 415/1 |
| 2013/0328315 A1 * | 12/2013 | Portolan | ................. | F03B 13/10 290/54 |
| 2014/0001893 A1 * | 1/2014 | Van Dam | ................. | H02K 7/14 310/52 |
| 2014/0009014 A1 * | 1/2014 | Scuotto | .................... | H02K 9/10 310/55 |
| 2014/0102425 A1 * | 4/2014 | Huang | .................... | F02B 33/40 123/565 |
| 2014/0133965 A1 * | 5/2014 | Ginsburg | ............ | F28D 21/0001 415/122.1 |
| 2014/0338358 A1 * | 11/2014 | Lee | .......................... | F02C 5/12 60/776 |
| 2014/0369841 A1 * | 12/2014 | Duchene | ............... | F03B 13/264 416/223 A |
| 2015/0028592 A1 * | 1/2015 | Ori | ........................ | F03D 1/025 290/44 |
| 2015/0056075 A1 * | 2/2015 | Birarov | ..................... | F03D 1/00 416/1 |
| 2015/0222151 A1 * | 8/2015 | Semken | ................. | H02K 1/148 310/216.008 |
| 2016/0123174 A1 * | 5/2016 | Ettridge | .................. | F01D 19/00 290/46 |
| 2016/0126790 A1 * | 5/2016 | Piech | ...................... | H02K 1/276 310/156.12 |

FOREIGN PATENT DOCUMENTS

| | | |
|---|---|---|
| CN | 101002017 A | 7/2007 |
| WO | 2005/080790 A1 | 9/2005 |

OTHER PUBLICATIONS

Chinese Office Action and search report dated Apr. 21, 2017 in corresponding Chinese patent application No. 2014800580749 (with English partial translation and partial machine translation (16 pages) (D1 US20120007364, D2 US20100148515, and D5 WO2005/080790 cited in the search report are not listed in this IDS since they were already listed in the IDS filed Mar. 4, 2016).

Chinese Office Action dated Mar. 14, 2018 in corresponding Chinese patent application No. 201480058074.9 (English translation; 7 pages) (D1, WO2005/080790 cited in the Chinese Office Action is not listed in this IDS since it was already listed in the IDS filed Mar. 4, 2016).

EPO Office Action dated Sep. 25, 2018 in corresponding EPO patent application No. 14766407.2 (with English machine translation; 11 pages) (D1, WO2005/080790, D2, US20100148515, and D3, US20120007364 cited in the EPO Office Action are not listed in is IDS since they were already listed in the IDS filed Mar. 4, 2016).

Chinese Office Action dated Dec. 5, 2018 in counterpart Chinese patent application No. 201480058074.9 (English translation; 7 pages) (D1, WO2005/080790, D2, CN2434818 cited in the Chinese Office Action are not listed in this IDS since they were already listed in the IDS filed Mar. 4, 2016 and Nov. 7, 2018, respectively).

Yu et al., "The Spacecraft Mechanism Technology", China Science and Technology Press, pp. 221-223, Jan. 2011 (with English machine translation; 10 pages).

* cited by examiner

CURRENT GENERATION DEVICE FOR PIPELINE

TECHNICAL FIELD OF THE INVENTION

The invention relates to the field of current generation, notably from the flow of a fluid in a duct or a pipeline.

The subject of the invention is, more particularly, a device for generating an electrical current, said device being intended to form a part of a pipeline for circulation of a fluid, notably liquid.

Another object according to the invention relates to a kit making it possible to use a pipeline with an electrical current generation device.

Yet another object of the invention relates to an installation provided with a pipeline for circulation of a fluid in which the fluid circulates, said pipeline comprising at least one device for generating electrical current from the circulation of the fluid within the pipeline.

STATE OF THE ART

In the field of electricity generated from renewable energies such as water, it is common practice to channel the water from a dam in a large duct several meters in diameter in order to drive a turbine arranged in the pipeline. These technologies are generally installed in so-called hydroelectric power stations.

In hydroelectric power stations, there are turbines whose stator and rotor are arranged in the main flow of the channelled water, the presence of the stator disrupts the fluid and limits the efficiency. Furthermore, in this case, the axis of rotation of the rotor is linked to the stator, and the result thereof is an issue of seal-tightness right at the centre of the pipeline.

Alternatively, there are also hydroelectric power stations whose rotor situated in the pipeline comprises an axis of rotation linked to a stator outside of said pipeline in order to generate the electrical current. Here again, the constraints require the installation of significant sealing devices.

In addition to the problems targeted above, these solutions are not suited to pipelines of any type of size, in particular they cannot be suitable for pipelines for supplying a building with fluid.

OBJECT OF THE INVENTION

The aim of the present invention is to propose a solution which remedies all or some of the drawbacks listed above.

This aim is approached by virtue of a device for generating an electrical current intended to form a part of a pipeline for the circulation of a fluid, notably liquid, said device comprising a pipe element, a rotor suitable for being set in motion by the fluid upon its passage into said device and a stator arranged to cooperate with an end of the rotor opposite to an axis of rotation of said rotor in order to generate the electrical current upon said motion, said axis of rotation being mounted at its opposing longitudinal ends on first and second supports arranged on either side of the plane of rotation of the rotor and each linked to the pipe element. Moreover, the stator advantageously comprises at least one ring arranged on one side of the rotor, notably two rings arranged on either side of the rotor, and each ring can comprise a circuit suitable for generating all or part of the electrical current when it is excited by at least one magnetic element of the rotor.

Preferentially, the device comprises a housing in which are arranged the rotor and the stator, the pipe element comprising a first pipe part and a second pipe part arranged on either side of the housing, notably the first and second pipe parts are coaxial to one another and with the axis of rotation of the rotor.

According to a particular embodiment, the device comprises first and second shells joined, preferably in a dismantleable manner, to one another so as to form the housing, the first shell comprises the first pipe part and the second shell comprises the second pipe part.

According to one implementation, the stator is arranged such that a part of the fluid participates in the cooling of said stator upon its passage into said device.

According to an example of said implementation, at least one passage is formed in the stator so as to cool it by allowing a circulation of the part of fluid through said passage. Preferably, the circuit of each ring comprises at least one coil, said at least one passage being formed along the winding axis of said coil.

According to another example of said implementation, the stator has an outer surface, notably arranged facing the rotor, in contact with said part of fluid and allowing a cooling by convection.

Advantageously, at least one longitudinal end of the axis of rotation, in contact with the first, or the second, corresponding support is distant from the plane of rotation of the rotor by a distance greater than or equal to the radius of the rotor.

According to a refinement, the first support and/or the second support comprises a system for setting the distance separating the first and second supports, notably in order to set the position of the plane of rotation of the rotor between the first and second supports.

According to one embodiment, the first support comprises a surface of contact with the axis of rotation of the rotor formed by a part of a spherical surface, notably delimited by a ball incorporated in the first support, and the second support comprises a second surface of contact with the axis of rotation of the rotor formed by a part of a spherical surface, notably delimited by another ball incorporated in the second support.

For example, the first and second supports each comprise a cavity extending between the first surface of contact, respectively the second surface of contact, and an associated opening allowing the insertion of a corresponding part of the axis of rotation, each cavity comprising a first section of cylindrical section and a second section of preferably conical form, widening from the first section towards the opening, and, for each cavity, said corresponding part of the axis of rotation is housed in said cavity and has a form complementing said cavity.

According to another refinement, the device comprises a system for maintaining the distance separating the two rings arranged on either side of the plane of rotation of the rotor. For example, the maintaining system comprises a spacer linking the two rings, notably the spacer comprises two parts each secured to a corresponding ring.

The invention also relates to a kit for using a pipeline comprising a device as described, said device being dismantleable, the kit comprises at least two types of stator and/or at least two types of rotor.

The invention also relates to an installation provided with a pipeline for circulation of a fluid in which the fluid circulates, said pipeline comprises at least one electrical current generation device as described.

BRIEF DESCRIPTION OF THE DRAWINGS

Other advantages and features will emerge more clearly from the following description of particular embodiments of the invention, given as nonlimiting examples and represented in the attached drawings, in which.

DESCRIPTION OF PREFERRED EMBODIMENTS OF THE INVENTION

The current generation device described hereinbelow differs from the prior art by its structure, notably by the arrangement of the rotor relative to the stator, and in particular with regard to the maintaining of the axis of rotation of the rotor.

FIGS. 1 to 4 illustrate a device for generating an electrical current intended to form a part of a pipeline for circulation of a fluid. The fluid is notably a liquid, and more particularly water. Obviously, any other type of fluid suitable for driving the rotation of a rotor can also be used.

"Pipeline for circulation of a fluid" should be understood to mean, for example, a set of tubes or pipes intended for remote transportation or for distribution of the fluid.

The flow of the fluid within the pipeline is generally constrained, for example by a pump.

The device comprises a pipe element 1 and a rotor 2 suitable for being set in motion by the fluid upon its passage into said device, in particular into the pipe element 1. Typically, the fluid passes through the device in a direction of flow indicated by the arrow F1.

A stator of the device is formed of two rings 3a, 3b located on either side of the rotor 2 and arranged to cooperate with an end of the rotor 2 opposite to an axis of rotation 4 of said rotor 2 in order to generate the electrical current upon said motion. In other words, the device comprises a plane of rotation P1 of the rotor 2 (at right angles to the plane of the figure in FIGS. 2 and 4). The plane of rotation P1 is defined as the plane including a circle described by the rotor 2 when the latter is rotating. When the fluid passes into said device, its direction of flow is such that it is secant to the plane of rotation of the rotor, and preferably at right angles to the plane of rotation of the rotor.

The rotor 2 therefore acts as an inductor and the stator 3a, 3b as an armature. Preferably, the rotor/stator association is of the type with axial magnetic flux.

It will then be understood from the above that, when the rotor 2 comprises an axial flow impeller, the stator 3a, 3b cooperates with the end of the rotor 2 at the point of large diameter of the axial flow impeller. Preferably, the stator comprises parts or rings arranged on either side of the axial flow impeller in the case of the axial magnetic flux or a part arranged in the extension of the axial flow impeller in the case of a radial magnetic flux.

According to such a structure, the stator 3a, 3b can be moved out of the main flow of the fluid at the centre of the device, and does not induce any loss of head of said fluid as in the prior art. Furthermore, here, the axis of rotation 4 of the rotor 2 is not used to be mechanically coupled to the stator 3a, 3b in order to generate the current, and the result thereof is that the rotor 2 is not slowed down by the stator because of the coupling. Furthermore, advantageously, the zone of generation of the electrical current (zone of interaction between the stator and the rotor) does not lie in the extension of the pipe element 1, so that the stator 3a, 3b does not hamper the passage of the fluid.

Furthermore, the axis of rotation 4 is mounted, at its opposing longitudinal ends 4a, 4b (visible in FIG. 4), on first and second supports 5a, 5b arranged on either side of the plane of rotation P1 of the rotor 2 and each linked to the pipe element 1. This makes it possible to best constrain the positioning of the plane of rotation P1 of the rotor 2 in order to avoid having the latter tap into the stator 3a, 3b in case of disturbance in the fluid passing through said device. Typically, the first and second supports 5a, 5b can each be linked to the pipe element 1 by at least one mechanical link element 5c fixed directly onto the support 5a, 5b concerned, and also to the pipe element 1 (in particular at an internal surface of the pipe element), the mechanical link element 5c can be a rod or a stay.

The axis of rotation 4 of the rotor is preferentially set relative to the rest of the rotor 2. Furthermore, the axis of rotation 4 may be constrained between its two opposing longitudinal ends 4a, 4b by the first and second supports 5a, 5b so as to inhibit the translation of the rotor 2 in the direction of the axis of rotation 4.

Preferably, the device comprises a housing 6 in which are arranged the rotor 2 and the stator 3a, 3b. The pipe element 1 then comprises a first pipe part 1a and a second pipe part 1b arranged on either side of the housing 6. In particular, the first and second pipe parts 1a, 1b are coaxial to one another and with the axis of rotation 4 of the rotor 2. This particular positioning makes it possible to ensure a better maintaining of the positioning of the rotor 2 within the device because the disturbances induced by the flow of the fluid will be minimized. It will then be understood that, when the fluid passes through the device, it passes successively into the first pipe part 1a, the housing 6 where it sets the rotor 2 in motion, and finally into the second pipe part 1b. The housing 6 forms, externally, an annular protuberance separating the first and second pipe parts 1a, 1b, and it is advantageously in this annular protuberance that the stator 3a, 3b is housed in order for the latter not to hamper the passage of the fluid into the housing 6 in the extension of the first pipe part 1a situated between said first pipe part 1a and the second pipe part 1b.

Still in expectation of ensuring a good maintaining of the positioning of the plane of rotation P1 of the rotor 2, at least one longitudinal end of the axis of rotation 4, in contact with the first, or the second, corresponding support 5a, 5b is preferentially distant from the plane of rotation P1 of the rotor 2 by a distance greater than or equal to the radius of the rotor 2. Although this arrangement is preferred, it is also possible to produce the device in such a way that said distance is less than the radius of the rotor 2. Preferably, the two opposing longitudinal ends 4a, 4b of the axis of rotation 4, respectively in contact with the first and the second support 5a, 5b are each distant from the plane of rotation P1 of the rotor 2 by a distance greater than or equal to the radius of the rotor 2. As stated previously, these two opposing longitudinal ends 4a, 4b are, preferably, constrained between the first and second supports 5a, 5b.

Figure 5:
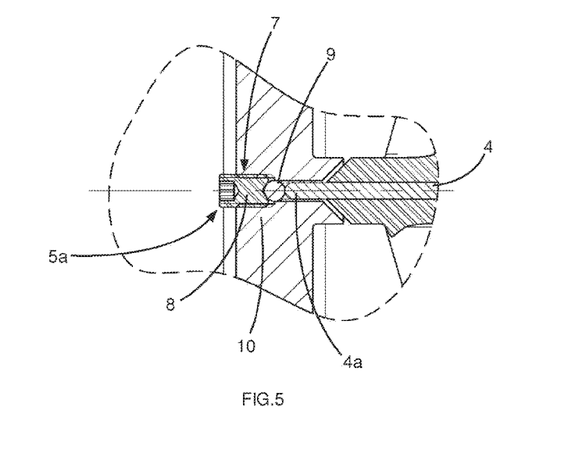
FIG. 5 is a detailed view of a particular embodiment of a support of the axis of rotation, FIG. 6 gives an example of incorporation of the device within a pipeline.

It will be understood from the above that the first and second supports 5a, 5b can have a role to play as regards the positioning of the rotor 2, particularly in order to position its plane of rotation P1. In this regard, it is advantageous to be able to adjust the positioning of the plane of rotation of the rotor 2, or even to be able to take up a manufacturing play in the length separating the two supports 5a, 5b so as to inhibit the translation of the axis of rotation 4 and therefore of the plane of rotation P1 (in particular a manufacturing play in the length separating the surfaces of contact of the two supports 5a, 5b intended to constrain the axis of rotation 4 to avoid its translation in its direction of elongation). Thus, as illustrated in FIG. 5, the first support 5a and/or the second support can comprise a system 7 for setting the distance separating the first and second supports 5a, 5b, notably in order to set the position of the plane of rotation P1 of the rotor 2 between the first and second supports 5a, 5b. This setting system 7 can for example comprise a setting member 8 suitable for translating a surface of contact 9 of the support 5a concerned with the longitudinal end 4a of the axis of rotation 4 in the direction of said axis of rotation 4. In fact, the setting member 8 and a part 10 of the support concerned 5a can each comprise a thread, the threads being complementary to allow the setting member 8 to be screwed onto and/or unscrewed from the part 10 of the support 5a. What has just been described applies equally to the first support 5a and to the second support 5b. Furthermore, it will be understood that for a finest possible setting of the positioning of the plane of rotation, it is preferable for the first and second supports 5a, 5b to be both provided with such a setting system 7 (notably given that the distance separating the two opposing longitudinal ends 4a, 4b of the axis of rotation 4, for its part, remains set).

Generally, the first support 5a can comprise a surface of contact with the axis of rotation 4 of the rotor 2 formed by a part of a spherical surface, notably delimited by a ball 11a (FIG. 4) incorporated in the first support 5a, and the second support 5b can comprise a second surface of contact with the axis of rotation 4 of the rotor 2 formed by a part of a spherical surface, notably delimited by another ball 11b (FIG. 4) incorporated in the second support 5b. The advantage of the use of such surfaces is to limit the surfaces of contact between the axis of rotation 4 and the supports 5a, 5b in order to limit the forces opposing the rotation of the rotor 2. It will then be understood that the axis of rotation 4 is limited in translation in its longitudinal direction by the first and second supports 5a, 5b, and in particular by the first and second surfaces while allowing its rotation upon the movement of the fluid. In combination with the setting system, the separation distance that it is sought to set is that between the first and second surfaces of contact.

Advantageously, the first and second supports 5a, 5b each comprise a cavity extending between the first surface of contact, respectively the second surface of contact, and an associated opening allowing the insertion of a corresponding part of the axis of rotation 4. Each cavity (FIG. 4) comprises a first section 12a of cylindrical section, extending notably from the associated surface of contact, and a second section 12b of preferably conical form, widening from the first section 12a towards the opening. Preferably, the corresponding part of the axis of rotation 4 is housed in the cavity and has a form complementing said cavity. In particular, a ring 13, preferably of brass, surrounds the cylindrical part of the axis of rotation 4 complementing the cylindrical section. This ring 13 is advantageously fixed to the corresponding support. The role of the ring 13 is to limit the frictions and avoid greasing. The material forming the ring 13 is a material which does not rust, and which is preferably inert with respect to the fluid. The second section 12b, for its part, by virtue of its form, makes it possible to facilitate the insertion of the axis of rotation 4 into the cavity upon the mounting of the device.

Figure 6:
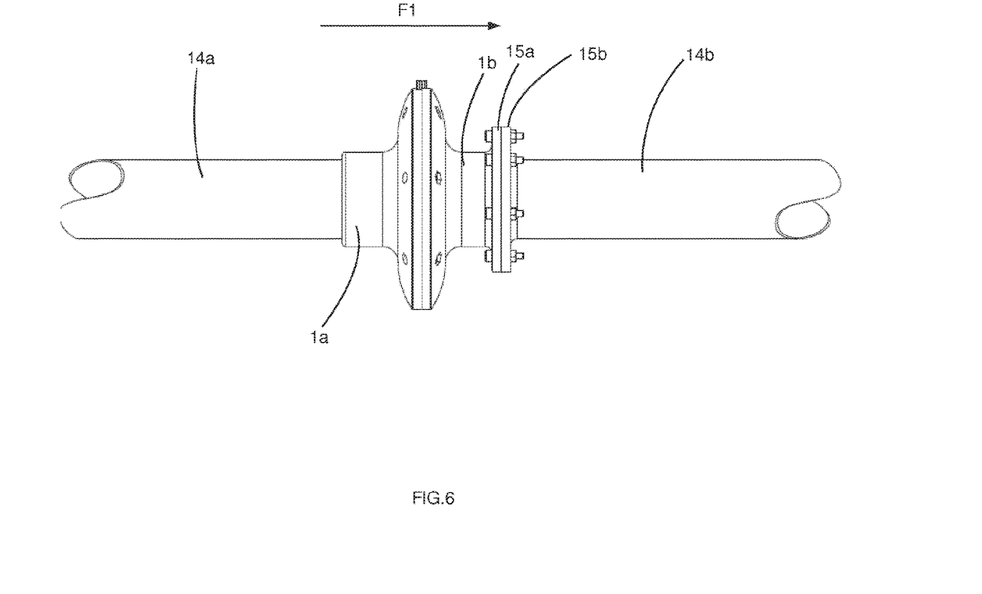

As illustrated in FIG. 6, the first pipe part 1a is configured so as to be fixed to an upstream pipe element 14a according to the direction of flow F1 of the fluid, and the second pipe part 1b is configured so as to be fixed to a downstream pipe element 14b according to the direction of flow F1 of the fluid. In the example of FIG. 6, the first pipe part 1a is configured so as to be sleeved by the upstream pipe element 14a and the second pipe part 1b comprises a protuberance 15a configured to cooperate notably by flanging, with a corresponding protuberance 15b of the downstream pipe element 14b. Obviously the particular example is not limiting, for example the fixings can be reversed, the first and second pipe parts 1a, 1b can be fixed respectively to the upstream pipe element 14a and to the downstream pipe element 14b by sleeving or by flanging.

According to a particular embodiment illustrated in FIGS. 1 to 4, the device comprises first and second shells 16a, 16b joined, preferably in a dismantleable manner, to one another so as to form the housing 6, the first shell 16a comprises the first pipe part 1a and the second shell 16b comprises the second pipe part 1b. These shells facilitate the assembly of the device, and allow for a more suitable maintenance in case of a problem with the current generation device by facilitating its dismantling. In effect, in the disassembled configuration, it may be possible to swap the rotor 2 and/or the stator 3a, 3b. For example, each shell 16a, 16b comprises a cavity making it possible to house a part of the stator 3a, 3b.

For example, the seal-tightness of the assembly of the two shells 16a, 16b is produced by a seal 17 (FIGS. 2 to 4), notably an O-ring seal, arranged between the two shells 16a, 16b. The fixing of the assembly of the two shells 16a, 16b, for its part, can be done by using bolts 18 (FIGS. 2 to 4) flanging the shells 16a, 16b against one another. This same seal 17 can also make it possible to ensure the seal-tightness of the housing despite the exit of electrical cables 30 (FIGS. 2 to 3) linked to the stator 3a, 3b so as to tap the electrical current generated therefrom.

Figure 1:
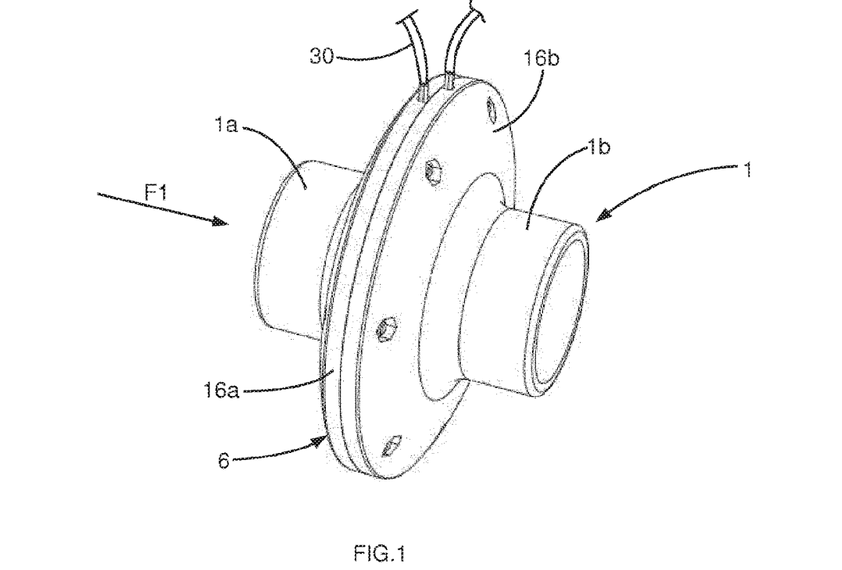
FIG. 1 is a perspective view of a current generation device according to an exemplary embodiment of the invention.
Figure 2:
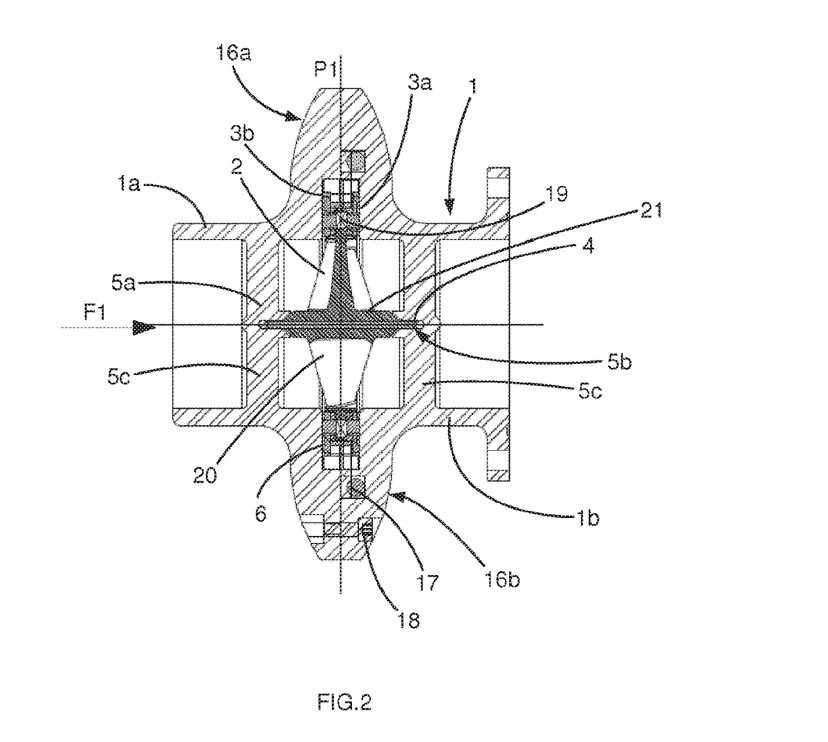
FIG. 2 is a view in longitudinal cross section of the device of FIG. 1.
Figure 3:
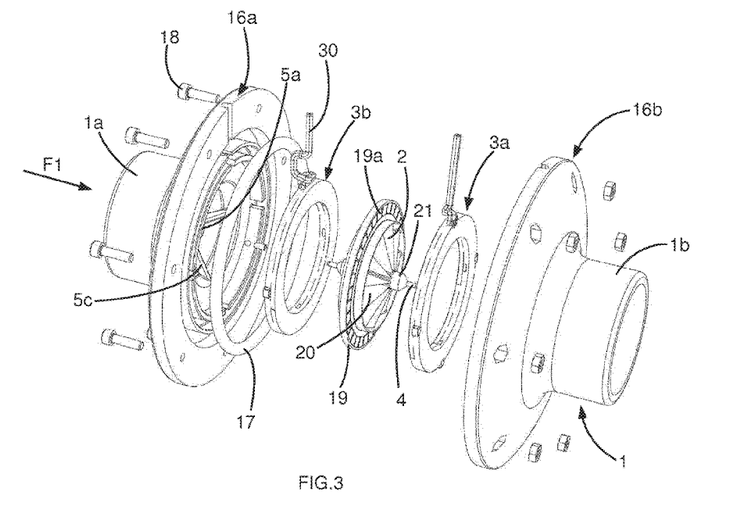
FIG. 3 is an exploded perspective view of FIG. 1.
Figure 4:
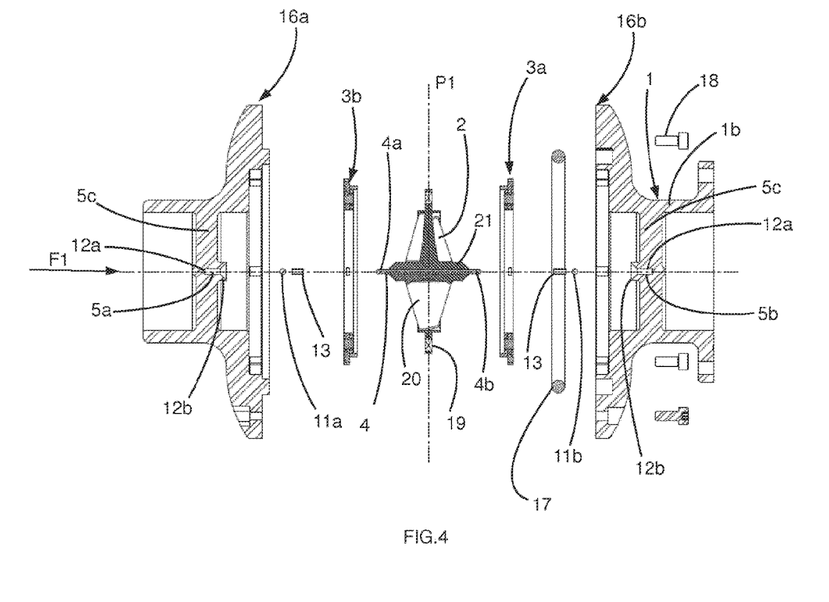
FIG. 4 is a view in longitudinal cross section of FIG. 3.

According to a particular implementation, the stator comprises at least one ring 3a preferably arranged on one side of the rotor 2, and notably two rings 3a, 3b arranged on either side of the rotor 2. When two rings 3a, 3b are arranged on either side of the plane of rotation of the rotor 2, the current generation device is said to be with axial magnetic flux (alternatively, one ring can surround the rotor so as to form a current generation device with radial magnetic flux). Each ring 3a, 3b comprises a circuit suitable for generating all or part of the electrical current (all if a single ring, and a part if two rings) when it is excited by at least one magnetic element of the rotor 2. Each circuit can comprise a plurality of coils linked in series, alternatively each circuit is formed by planar coils linked in series. In FIGS. 2 to 4, the two rings 3a, 3b are housed in the housing 6 (notably in corresponding cavities of the housing formed respectively in the first shell 16a and the second shell 16b). Preferentially, the internal diameter of the ring or rings is such that it is greater than the diameter of the pipe element, and in addition the two rings 3a, 3b are advantageously coaxial to the pipe element 1 (in particular coaxial to the first pipe part 1a and to the second pipe part 1b) so as to not hamper the passage of the fluid into the housing 6.

According to a particular implementation of the rotor 2 (FIGS. 2 to 4), the latter can comprise a rotary crown ring 19 provided with at least one, or a plurality of, magnetic element(s) 19a. In fact, when the rotor 2 comprises an axial flow impeller provided with a number of blades 20 (FIGS. 2 to 4), the blades 20 are all linked on the one hand to a hub 21 of the axial flow impeller mounted on the axis of rotation 4 (notably secured in movement, the rotation of the axis of rotation 4 driving the rotation of the hub 21 and therefore of the rest of the rotor 2) and, on the other hand to said crown ring 19. The crown ring 19 can then delimit the circle of rotation in which the rotation of the rotor 2 is inscribed.

The positioning of the two rings 3a, 3b relative to one another and advantageously relative to the rotor 2 also makes it possible to improve the efficiency of the electrical current generation device. In this respect, the device can comprise a system for maintaining the distance separating the two rings 3a, 3b arranged on either side of the plane of rotation P1 of the rotor 2.

Figure 7:
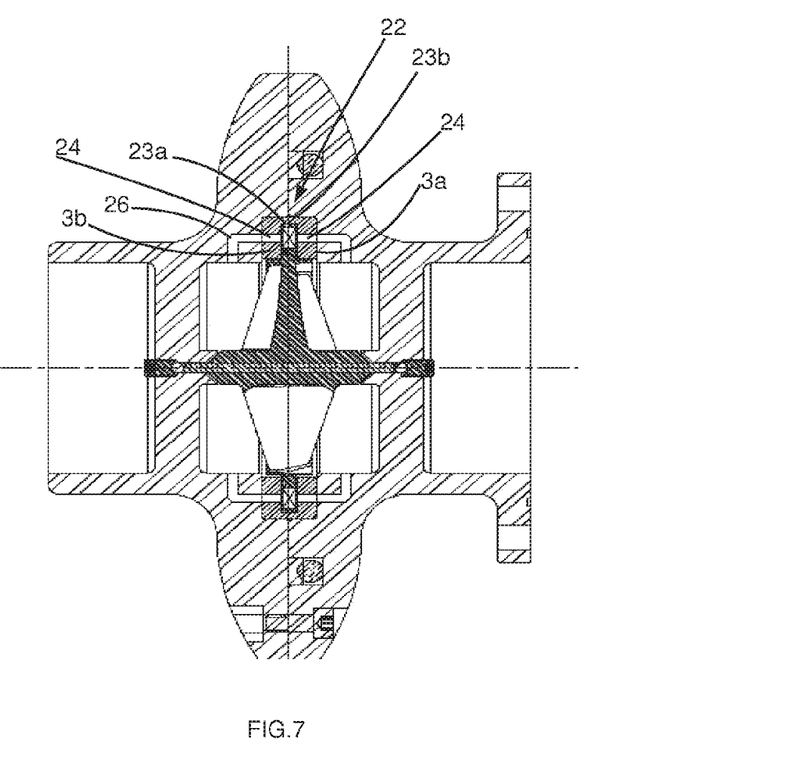
FIG. 7 illustrates a transverse cross-sectional view of FIG. 1 according to a particular embodiment making it possible to set the distance separating two rings of the stator.

In particular, as illustrated in FIG. 7, the maintaining system 22 comprises a spacer linking the two rings 3a, 3b. In particular, the spacer is formed by a first lip 23a extending from the ring 3a and by a second lip 23b extending from the ring 3b. When the free ends of the first and second lips 23a, 23b are in contact, the spacer is formed. In other words, the spacer can be formed by two parts each secured to a corresponding ring.

Preferably, the stator 3a, 3b does not include any ferromagnetic element intended to orient the magnetic flux induced by the rotor 2. This makes it possible to obtain a device that is more compact and easier to cool. This is advantageous when the device is said to be with axial flux.

The presence of ferromagnetic element(s) is advantageous when the aim is to rectify the magnetic field of the rotor. However, this presence can induce bonding effects between the stator and the rotor. Thus, in configurations in which bonding is not a problem (for example an arrangement of the rotor with the stator with radial flux) or it can be avoided, the device can comprise one or more ferromagnetic elements acting on the magnetic field of the rotor in order to orient it. A ferromagnetic element can be covered with resin so as not to be oxidized by the fluid.

It will be understood from the above that the electrical current is generated by the interaction between the stator and the rotor, and notably by the interaction of revolving magnetic fields derived from one or more magnets borne by the rotor with one or more circuits of the ring or rings of the stator. This interaction can provoke an overheating of the stator 3a, 3b reducing the efficiency of the electrical current production. The result thereof is a stator 3a, 3b cooling issue. This issue can be resolved by the fact that the stator 3a, 3b is arranged in such a way that a part of the fluid (also called secondary part of the fluid) participates in the cooling of said stator upon its passage into said device. In fact, when the fluid passes from the first pipe part 1a to the housing 6, a main part of the fluid passes through the rotor 2 and the stator 3a, 3b so as to arrive in the second pipe part 1b and a secondary part of the fluid tends to fill the housing 6 so as to be in contact with the stator 3a, 3b and the end of the rotor 2.

Figure 8:
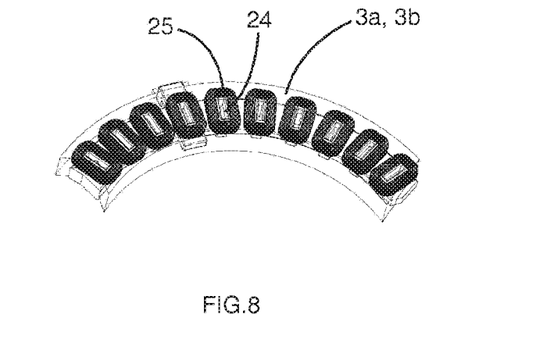
FIG. 8 illustrates a partial view of a ring of the stator according to a particular embodiment.

According to a first embodiment of the cooling of the stator 3a, 3b illustrated in FIGS. 7 and 8, at least one passage 24 is formed in the stator so as to cool it by allowing a circulation of the part of fluid through said passage 24. In particular, the circuit of each ring 3a, 3b comprises at least one coil 25, said at least one passage 24 being formed along the winding axis of said coil 25. Preferentially, each ring 3a, 3b comprises a plurality of coils 25, notably linked in series, and all or part of the plurality of coils 25 is associated with a passage 24 intended to participate in the cooling of the coil 25 concerned. Preferably, the device comprises a bypass duct 26 (FIG. 7) making it possible to tap the part of fluid intended to cool the stator upstream of the housing 6 and to distribute said part of fluid at the stator 3a, for example directly into the passage or passages 24 or along the outer surface of the stator. The same thing can be present downstream of the rotor 2 as illustrated in FIG. 7.

According to a second embodiment of the cooling of the stator 3a, 3b, the latter has an outer surface, notably arranged facing the rotor 2, in contact with said part of fluid and allowing a cooling by convection. In fact, in this case, the circuit can be simply covered by an epoxy or polyurethane paint ensuring the electrical insulation of the circuit relative to the fluid. More generally, each circuit can be coated by an electrically insulating material, notably such that the coating exhibits a thermal convection resistance suited to the desired cooling.

The first and second embodiments of the cooling can of course be combined.

According to another object of the invention, a kit for using a pipeline comprises a device as described previously according to any one of its variants/embodiments. The device is, in this case, dismantleable, and the kit comprises at least two types of stator and/or at least two types of rotor. Thus, it is easy for an installer to chose a precise configuration of the device notably as a function of the type of fluid used and/or of the speed of flow of the fluid in the pipeline to maximize the efficiency of the electrical current generated from the flow of the fluid.

Generally, the device is such that it is advantageously suited to pipelines with a diameter of between 50 mm and 2000 mm.

Moreover, the fluid, when it arrives at the inlet of the pipe element upstream of the rotor, typically has a flow rate of less than 6 m/s and preferably between 0 and 2.5 m/s.

According to another object of the invention, an installation can be provided with a pipeline for circulation of a fluid in which the fluid circulates, said pipeline comprising at least one electrical current generation device as described. Thus, the circulation of the fluid in the electrical current generation device makes it possible to generate said current by driving the rotor in rotation.

More particularly, it will be understood that the device can be configured in such a way as to be adapted to a water network. A water network comprises a system of pipelines making it possible to route the water between at least two points and distribute it to a user. In other words, the current generation device does not require the installation which includes it to be provided with a water column very significantly increasing the pressure as in the case of a dam-type installation. Thus, the installation described above can be an installation for distributing water, for example potable water, like the water distribution network of a town.

It will also be understood that, according to an embodiment that can be combined with everything stated in the present description in context in which the fluid is from a water network, the rotor of the current generation device is therefore configured in such a way that its interaction with the fluid (therefore the water) flowing in the water network is sufficient to drive it in rotation and generate said electrical current.

Generally, the electrical current generated can be injected into an electrical network.

It will also be understood that such a device can advantageously be used to supply electrical energy to a given point along a fluid distribution network where electricity is not available.

The invention claimed is:

1. A device for generating an electrical current intended to form a part of a pipeline for the circulation of a fluid, the device comprising:
    a pipe element,
    a rotor suitable for being set in motion by the fluid upon passage of the fluid into the device, and
    a stator arranged to cooperate with a radial end of the rotor opposite to an axis of rotation of the rotor in order to generate the electrical current upon said motion,
    the axis of rotation of the rotor being rotatably mounted at its opposing longitudinal ends on a first support and a second support each linked to the pipe element,
    wherein the stator comprises at least one ring arranged on one side of the rotor, and each ring comprises a circuit suitable for generating all or part of the electrical current when it is excited by at least one magnetic element of the rotor,
    wherein the rotor comprises an impeller portion configured for interacting with the fluid and a radial portion configured for interacting with the stator for generating the electrical current, the impeller portion and the radial portion being mounted on the axis of rotation at a location placed longitudinally between the first support and the second support,
    wherein at least one of the first support and the second support comprises a system or setting a distance separating the first and second supports, wherein the system comprises a setting member having a surface of contact of the support with one of the longitudinal ends of the axis of rotation of the rotor, wherein the surface of contact is translatable in a longitudinal direction.

2. The device according to claim 1, comprising a housing in which are arranged the rotor and the stator, the pipe element comprising a first pipe part and a second pipe part arranged on either side of the housing.

3. The device according to claim 2, comprising a first shell and a second shell joined to one another so as to form the housing, wherein the first shell comprises the first pipe part and the second shell comprises the second pipe part.

4. The device according to claim 3, wherein the first and second shells are joined to one another in a dismantleable manner.

5. The device according to claim 2, wherein the first and second pipe parts are coaxial to one another and with the axis of rotation of the rotor.

6. The device according to claim 1, wherein the stator is arranged so that a part of the fluid participates in cooling the stator upon passage of the fluid into the device.

7. The device according to claim 6, wherein at least one passage is formed in the stator so as to cool the stator by allowing a circulation of the part of fluid through the passage.

8. The device according to claim 7, wherein the circuit of each ring comprises at least one coil, the at least one passage being formed along the winding axis of the coil.

9. The device according to claim 6, wherein the stator has an outer surface in contact with the part of fluid and allowing a cooling by convection.

10. The device according to claim 9, wherein the outer surface of the stator is arranged facing the rotor.

11. The device according to claim 1, wherein at least one longitudinal end of the axis of rotation is in contact with one of the first and second supports and is distant from the plane of rotation of the rotor by a distance greater than or equal to the radius of the rotor.

12. The device according to claim 1, wherein the first support comprises a first surface of contact with a first end face of the axis of rotation of the rotor, wherein the first surface of contact is formed by a part of a first spherical surface facing the first end face of the axis of rotation in a longitudinal direction, and wherein the second support comprises a second surface of contact with a second end face of the axis of rotation of the rotor, wherein the second surface of contact is formed by a part of a second spherical surface facing the second end face of the axis of rotation in a longitudinal direction.

13. The device according to claim 12, wherein the first support and the second support each comprise a cavity extending between the first surface of contact, respectively the second surface of contact, and an associated opening allowing the insertion of a corresponding part of the axis of rotation, each cavity comprising a first section of cylindrical section and a second section widening from the first section towards the opening, and wherein, for each cavity, the corresponding part of the axis of rotation is housed in the cavity and has a form complementing the cavity.

14. The device according to claim 1, wherein the stator comprises two rings, wherein a system for maintaining the distance separating the two rings is arranged on either side of the plane of rotation of the rotor.

15. The device according to claim 14, wherein the maintaining system comprises a spacer linking the two rings.

16. An installation provided with a pipeline for circulation of a fluid in which the fluid circulates, wherein the pipeline comprises at least one electrical current generation device according to claim 1.

17. The device according to claim 1, comprising two rings arranged on either side of the rotor.

18. The device according to claim 1, wherein the system sets a longitudinal position of the plane of rotation of the rotor between the first and second supports.

* * * * *

UNITED STATES PATENT AND TRADEMARK OFFICE
CERTIFICATE OF CORRECTION

| | | |
|---|---|---|
| PATENT NO. | : 10,374,484 B2 | Page 1 of 1 |
| APPLICATION NO. | : 14/916783 | |
| DATED | : August 6, 2019 | |
| INVENTOR(S) | : Bernard Perriere | |

It is certified that error appears in the above-identified patent and that said Letters Patent is hereby corrected as shown below:

In the Claims

In Claim 1, Column 9, Line 37:
Change "a system or setting a distance"
To --a system for setting a distance--

Signed and Sealed this
Twelfth Day of November, 2019

Andrei Iancu
*Director of the United States Patent and Trademark Office*